United States Patent
Zhang et al.

(10) Patent No.: US 8,836,286 B2
(45) Date of Patent: Sep. 16, 2014

(54) STORAGE BATTERY CHARGE CIRCUIT

(75) Inventors: Jun-Wei Zhang, Shenzhen (CN);
Shih-Fang Wong, New Taipei (TW);
Tsung-Jen Chuang, New Taipei (TW);
Jun Zhang, Shenzhen (CN); Chia-Hung Chien, New Taipei (TW); Chung-Jen Wang, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 357 days.

(21) Appl. No.: 13/220,635

(22) Filed: Aug. 29, 2011

(65) Prior Publication Data
US 2013/0021001 A1 Jan. 24, 2013

(30) Foreign Application Priority Data
Jul. 18, 2011 (CN) .......................... 2011 1 0200863

(51) Int. Cl.
*H02J 7/00* (2006.01)

(52) U.S. Cl.
CPC .................................. *H02J 7/0057* (2013.01)
USPC ....................................................... 320/128

(58) Field of Classification Search
USPC ........................................................ 320/128
See application file for complete search history.

(56) References Cited

U.S. PATENT DOCUMENTS

| | | | | |
|---|---|---|---|---|
| 4,317,233 A | * | 2/1982 | Kunde et al. | 398/128 |
| 2002/0125859 A1 | * | 9/2002 | Takeo et al. | 320/137 |
| 2002/0140398 A1 | * | 10/2002 | Isomichi et al. | 320/114 |
| 2004/0012375 A1 | * | 1/2004 | Bucur | 320/141 |
| 2005/0078491 A1 | * | 4/2005 | Song et al. | 363/17 |
| 2008/0278136 A1 | * | 11/2008 | Murtojarvi | 323/299 |
| 2009/0115393 A1 | * | 5/2009 | Yoshida et al. | 323/300 |
| 2009/0134861 A1 | * | 5/2009 | Saeki et al. | 323/299 |

* cited by examiner

*Primary Examiner* — Arun Williams
(74) *Attorney, Agent, or Firm* — Novak Druce Connolly Bove + Quigg LLP

(57) ABSTRACT

A storage battery charge circuit for charging a battery is provided. The circuit includes a voltage input port, a converting circuit, and a charge circuit. The voltage input port is for being connected to a power source to receive a logic high level voltage. The converting circuit is connected to the voltage input port to convert the received logic high level voltage into a control signal including a logic high level voltage and a logic low level voltage alternately and the mark space ratio is not equal to one. The charge circuit is connected to the converting circuit to charge the battery or discharge the battery according to the control signal.

7 Claims, 1 Drawing Sheet

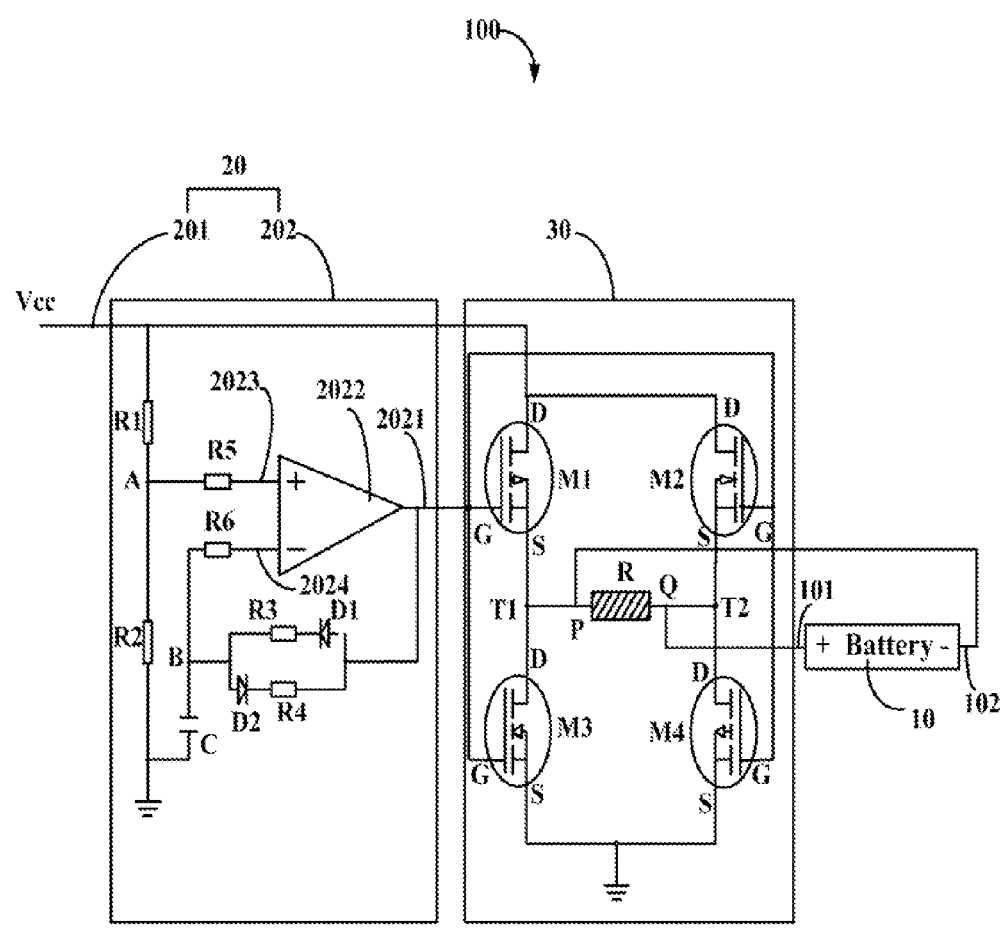

STORAGE BATTERY CHARGE CIRCUIT

BACKGROUND

1. Technical Field

The present disclosure relates to a storage battery charge circuit.

2. Description of Related Art

It is known that when a storage battery such as a lead-acid battery discharges, lead sulfate forms on the battery's plates. When the lead sulfate reaches a certain amount, the battery may be no longer used. In order to prolong the service life of the battery, during the charging of the battery, a charge circuit charges the battery for a relatively longer time and causes the battery to discharge for a relatively shorter time alternately, to reduce lead sulfate on the battery's plate. However, the structure of such a charge circuit is usually complex. Therefore, it is desirable to provide a simple storage battery charge circuit.

BRIEF DESCRIPTION OF THE DRAWINGS

The components in the drawing are not necessarily drawn to scale, the emphasis instead being placed upon clearly illustrating the principles of the present disclosure.

The drawing is a circuit diagram of a storage battery charge circuit in accordance with an exemplary embodiment.

DETAILED DESCRIPTION

The disclosure is illustrated by way of example and not by way of limitation. It should be noted that references to "an" or "one" embodiment in this disclosure are not necessarily to the same embodiment, and such references mean at least one.

Referring to the drawing, a storage battery charge circuit 100 charges a storage battery 10. The circuit 100 includes a control signal output circuit 20 and a charge circuit 30. The control signal output circuit 20 includes a voltage input port 201 and a converting circuit 202. The voltage input port 201 is connected to a power source to receive a logic high level voltage. The converting circuit 202 is connected to the input port 201 to convert the received logic high level voltage to a control signal including a logic high level voltage and a logic low level voltage alternately. In addition, a mark space ratio of the control signal is not equal to one, that is, the duration of the logic high level voltage is different from the duration of the logic low level voltage of the control signal. The mark space ratio of the control signal may be greater than one or less than one. The converting circuit 202 further outputs the control signal through a signal output port 2021 of the converting circuit 202.

The charge circuit 30 is connected to the signal output port 2021 to charge the battery 10 and to discharge the battery 10 according to the control signal. In this embodiment, while charging the battery 10, when receiving logic high level voltage of the control signal, the charge circuit 30 charges the battery 10, and when receiving the logic low level of the control signal, the charge circuit 30 discharges the battery 10. In this embodiment, the mark space ratio of the control signal is greater than one, and the duration of the logic high level voltage of the control signal is greater than the duration of the logic low level voltage of the control signal. Therefore, the charge circuit 30 can fully charge the battery 10. Furthermore, with the charge circuit 30, when charging the battery 10, the battery 10 is charged and is discharged alternately, thus lead sulfate formed on the battery 10 may be used again, and the service life of the battery 10 is prolonged. In an alternative embodiment, the mark space ratio of the control signal is less than one, that is, the duration of the logic high level voltage of the control signal is less than the duration of the logic low level voltage of the control signal. While charging the battery 10, when receiving the logic low level voltage of the control signal, the charge circuit 30 charges the battery 10 and when receiving the logic high level voltage of the control signal, the charge circuit 30 discharges the battery 10.

The charge circuit 30 includes a load resistor R, a first MOS transistor M1, a second MOS transistor M2, a third MOS transistor M3, and a fourth MOS transistor M4. M1 and M4 are the same. M2 and M3 are same but different from M1 and M4. In this embodiment, M1 and M4 are PMOS transistors, and M2 and M3 are NMOS transistors. In an alternative embodiment, M1 and M4 are NMOS transistors, and M2 and M3 are PMOS transistors.

Grids G of M1, M2, M3, and M4 are connected to the signal output port 2021, drains D of M1 and M2 are connected to the voltage input port 201, a source S of M1 is connected to a drain D of M3, a source S of M2 is connected to a drain D of M4, and sources S of M3 and M4 are grounded. One terminal P of the resistor R is connected to the source S of M1 and the drain D of M3 to form a first node T1, and the terminal P is also connected to a cathode 102 of the battery 10. The other terminal Q of the resistor R is connected to the source S of M2 and the drain D of M4 to form a second node T2, and the terminal Q is also connected to an anode 101 of the battery 10.

When the charge circuit 30 receives the logic high level voltage of the control signal, M2 and M3 are turned on, and M1 and M4 are turned off. The voltage input port 201 is directly connected to the terminal Q of the resistor R, and the terminal P of the resistor R is grounded to form a loop circuit. The voltage of the terminal Q is greater than that of the terminal P, thus the circuit 100 charges the battery 10.

When the charge circuit 30 receives the logic low level voltage of the control signal, M1 and M4 are turned on, and M2 and M3 are turned off. The voltage input port 201 is directly connected to the terminal P of the resistor R, and the terminal Q of the resistor R is grounded to form a loop circuit. The voltage of the terminal P is greater than that of the terminal Q, thus the circuit 100 causes the battery 10 to be discharged. When the charge circuit 30 receives the logic high level voltage of the control signal again, the circuit 100 charges the battery 10 again. Thus, the battery 10 is charged and discharged alternately until the battery 10 is fully charged.

In this embodiment, the converting circuit 202 includes a voltage comparator 2022, a first resistor R1, a second resistor R2, a third resistor R3, a fourth resistor R4, a first diode D1, a second diode D2, and a capacitor C. The first resistor R1 and the second resistor R2 are connected in series between the voltage input port 201 and the ground. A positive terminal 2023 of the comparator 2022 is connected to one terminal of a resistor R5, and the other terminal of the resistor R5 is connected to R1 and R2 to form a third node A. A negative terminal 2024 of the comparator 2022 is grounded through the capacitor C and a resistor R6. The resistance values of R3 and R4 are different. One terminal of R3 is connected to the capacitor C and the resistor R6 to form a fourth node B. The other terminal of R3 is connected to a cathode of D1, and an anode of D1 is connected to an output port of the comparator 2022. One terminal of R4 is connected to the output port of the comparator 2022, the other terminal of R4 is connected to a cathode of D2, and an anode of D2 is connected to the node B. The output port of the comparator 2022 is taken as the signal output port 2021.

The voltage of the positive terminal 2023 of the comparator 2022 is at a logic high level. As the negative terminal 2024 of the comparator 2022 is grounded, initially the voltage of the negative terminal 2024 is at a logic low level, the output of the comparator 2022 is at a logic high level. The output logic high level charges the capacitor C through the diode D1 and the resistor R3. After the capacitor C is charged for a certain time, the voltage of the negative terminal 2024 of the comparator 2022 changes to be at a logic high level and the output of the comparator 2022 changes to be at a logic low level, and the capacitor C begins to discharge through the diode D2 and the resistor R4. When the voltage of the negative terminal 2024 of the comparator 2022 changes to be at the logic low level again, the output of the comparator 2022 changes to be at the logic high level again. Thus, the output port 2021 provides the control signal including the logic high level and the logic low level alternately to the charge circuit 30.

The resistance values of R3 and R4 are different, thus the charge time for charging the capacitor C and the discharge time of the capacitor C are different, and the duration of the logic high level is different from the duration of the logic low level of the control signal. In this embodiment, in order to make the duration of the logic high level greater than the duration of the logic low level of the control signal, the resistance value of R3 may be set to be greater than that of R4, to cause the mark space ratio of the control signal to be greater than one.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A storage battery charge circuit for charging a storage battery, the storage battery charging circuit comprising:
   a control signal output circuit comprising:
      a voltage input port for being connected to a power source to receive a logic high level voltage; and
      a converting circuit connected to the voltage input port to convert the received logic high level voltage into a control signal comprising a logic high level voltage and a logic low level voltage alternately, a mark space ratio of the control signal being greater than one or less than one, the converting circuit further to output the control signal through a signal output port; and
   a charge circuit connected to the signal output port to charge and discharge the storage battery alternately according to the control signal; wherein when the mark space ratio of the control signal is greater than one, a duration of the logic high level voltage of the control signal is greater than a duration of the logic low level voltage of the control signal, while charging the storage battery, when receiving the logic high level voltage of the control signal, the charge circuit charges the storage battery, and when receiving the logic low level voltage of the control signal, the charge circuit charges the storage battery reversely to cause the storage battery to be discharged.

2. A storage battery charge circuit for charging a storage battery, the storage battery charging circuit comprising:
   a control signal output circuit comprising:
      a voltage input port for being connected to a power source to receive a logic high level voltage; and
      a converting circuit connected to the voltage input port to convert the received logic high level voltage into a control signal comprising a logic high level voltage and a logic low level voltage alternately, a mark space ratio of the control signal being greater than one or less than one, the converting circuit further to output the control signal through a signal output port; and
   a charge circuit connected to the signal output port to charge and discharge the storage battery alternately according to the control signal; wherein when the mark space ratio of the control signal is less than one, a duration of the logic high level voltage of the control signal is less than a duration of the logic low level voltage of the control signal, while charging the storage battery, when receiving the logic low level voltage of the control signal, the charge circuit charges the storage battery, and when receiving the logic high level voltage of the control signal, the charge circuit charges the storage battery reversely to cause the storage battery to be discharged.

3. A storage battery charge circuit for charging a storage battery, the storage battery charging circuit comprising:
   a control signal output circuit comprising:
      a voltage input port for being connected to a power source to receive a logic high level voltage; and
      a converting circuit connected to the voltage input port to convert the received logic high level voltage into a control signal comprising a logic high level voltage and a logic low level voltage alternately, a mark space ratio of the control signal being greater than one or less than one, the converting circuit further to output the control signal through a signal output port; and
   a charge circuit connected to the signal output port to charge and discharge the storage battery alternately according to the control signal; wherein the charge circuit comprises a load resistor, a first MOS transistor, a second MOS transistor, a third MOS transistor, and a fourth MOS transistor, the first MOS transistor and the fourth MOS transistor are the same, the second MOS transistor and the third MOS transistor are the same but different from the first MOS transistor and the fourth MOS transistor, grids G of the first MOS transistor, the second MOS transistor, the third MOS transistor, and the fourth MOS transistor are connected to the signal output port of the converting circuit, drains of the first MOS transistor and the second MOS transistor are connected to the voltage input port, a source of the first MOS transistor is connected to a drain of the third MOS transistor, a source of the second MOS transistor is connected to a drain of the fourth MOS transistor, and sources of the third MOS transistor and the fourth MOS transistor are grounded, one terminal of the load resistor is connected to the source of the first MOS transistor and the drain of the third MOS transistor to form a first node, and the one terminal of the load resistor is also connected to a cathode of the storage battery, the other terminal of the load resistor is connected to the source of the second MOS transistor and the drain of the fourth MOS transistor to form a second node, and the other terminal of the load resistor is also connected to an anode of the storage battery.

4. The storage battery charge circuit as described in claim 3, wherein the first MOS transistor and the fourth MOS transistor are PMOS transistors and the second MOS transistor and the third MOS transistor are NMOS transistors.

5. The storage battery charge circuit as described in claim 3, wherein the first MOS transistor and the fourth MOS transistor are NMOS transistors and the second MOS transistor and the third MOS transistor are PMOS transistors.

6. The storage battery charge circuit as described in claim 3, wherein the converting circuit comprises a voltage comparator, a first resistor, a second resistor, a third resistor, a fourth resistor, a first diode, a second diode, and a capacitor, the first resistor and the second resistor are connected in series between the voltage input port and the ground, a positive terminal of the voltage comparator is connected to the first resistor and the second resistor to form a third node, a negative terminal of the voltage comparator is grounded through the capacitor, the resistance value of the third resistor is different from the resistance value of the fourth resistor, one terminal of the third resistor is connected to the capacitor and the negative terminal of the voltage comparator to form a fourth node, the other terminal of the third resistor is connected to a cathode of the first diode, an anode of the first diode is connected to an output port of the voltage comparator, one terminal of the fourth resistor is connected to the output port of the voltage comparator, the other terminal of the fourth resistor is connected to a cathode of the second diode, an anode of the second diode is connected to the fourth node, and the output of the voltage comparator is taken as the signal output port.

7. The storage battery charge circuit as described in claim 6, wherein the converting circuit further comprises a fifth resistor and a sixth resistor, the fifth resistor is connected between the positive terminal of the voltage comparator and the third node, and the sixth resistor is connected between the negative terminal of the voltage comparator and the fourth node.

* * * * *